(12) United States Patent
Jensen (10) Patent No.: US 9,109,813 B2
(45) Date of Patent: Aug. 18, 2015

(54) TWISTED CONDUIT FOR GEOTHERMAL HEATING AND COOLING SYSTEMS

(76) Inventor: Robert Jensen, Montvale, NJ (US)

( * ) Notice: Subject to any disclaimer, the term of this patent is extended or adjusted under 35 U.S.C. 154(b) by 337 days.

(21) Appl. No.: 12/660,226

(22) Filed: Feb. 23, 2010

(65) Prior Publication Data

US 2011/0203766 A1     Aug. 25, 2011

(51) Int. Cl.
*F24J 3/08* (2006.01)
*F16L 9/19* (2006.01)

(52) U.S. Cl.
CPC .. *F24J 3/083* (2013.01); *F16L 9/19* (2013.01); *Y02E 10/125* (2013.01)

(58) Field of Classification Search
CPC .............................. F24J 3/083; F28D 20/0052
USPC .............................................. 165/45; 62/260
See application file for complete search history.

(56) References Cited

U.S. PATENT DOCUMENTS

| 1,852,489 | A | * | 4/1932 | Sullivan | 165/156 |
|---|---|---|---|---|---|
| 1,852,490 | A | * | 4/1932 | Sullivan | 165/156 |
| 2,458,826 | A | | 1/1949 | Blumberg et al. | |
| 2,466,676 | A | * | 4/1949 | Boling et al. | 165/169 |
| 2,911,047 | A | | 11/1959 | Henderson | |
| 3,189,098 | A | | 6/1965 | Haeber | |
| 3,913,668 | A | | 10/1975 | Todd et al. | |
| 4,279,544 | A | | 7/1981 | Brun et al. | |
| 4,371,036 | A | | 2/1983 | Fordsmand | |
| 4,421,136 | A | | 12/1983 | Aubert | |
| 4,715,429 | A | * | 12/1987 | Mogensen | 165/45 |
| 4,917,175 | A | | 4/1990 | Sakaya et al. | |
| 4,995,450 | A | | 2/1991 | Geppelt et al. | |
| 5,238,058 | A | * | 8/1993 | Bodrey et al. | 165/164 |
| 5,329,992 | A | | 7/1994 | Tripp | |
| 5,477,914 | A | | 12/1995 | Rawlings | |
| 5,630,447 | A | | 5/1997 | Jensen | |
| 5,816,314 | A | * | 10/1998 | Wiggs et al. | 165/45 |
| 6,000,459 | A | | 12/1999 | Jeppesen | |
| 6,142,215 | A | | 11/2000 | Paulsen et al. | |
| 6,212,896 | B1 | | 4/2001 | Genung | |
| 6,860,320 | B2 | * | 3/2005 | Johnson et al. | 165/45 |
| 6,979,776 | B1 | | 12/2005 | Zimmerman | |
| 7,213,649 | B2 | * | 5/2007 | McNair et al. | 165/45 |
| 7,255,096 | B2 | | 8/2007 | Craig et al. | |
| 7,380,584 | B2 | | 6/2008 | Ippoushi et al. | |
| 7,575,047 | B2 | | 8/2009 | Lackinger et al. | |
| 2006/0137880 | A1 | | 6/2006 | Figenschou et al. | |
| 2007/0029067 | A1 | | 2/2007 | Kidwell et al. | |

(Continued)

FOREIGN PATENT DOCUMENTS

| CH | 000000658513 | 11/1986 |
|---|---|---|
| DE | 102007018979 B3 | 8/2008 |

(Continued)

OTHER PUBLICATIONS http://minnesotageothermalheatpumpassociation.com/geothermal/earth-loop-options.

(Continued)

*Primary Examiner* — Leonard R Leo
(74) *Attorney, Agent, or Firm* — Harold G. Furlow, Esq.

(57) ABSTRACT

The present invention relates to a conduit for use in a geothermal heating and cooling system wherein said conduit comprises 2 or more pipes, wherein further, said 2 or more pipes comprising said conduit are twisted together.

20 Claims, 9 Drawing Sheets

(56) References Cited

U.S. PATENT DOCUMENTS

| | | | |
|---|---|---|---|
| 2007/0158048 A1* | 7/2007 | Ferraro | 165/156 |
| 2008/0289795 A1 | 11/2008 | Hardin et al. | |
| 2009/0071639 A1 | 3/2009 | Numata et al. | |
| 2009/0107650 A1 | 4/2009 | Feldmann | |
| 2009/0321417 A1 | 12/2009 | Burns | |
| 2010/0025008 A1 | 2/2010 | Walford | |
| 2010/0270002 A1* | 10/2010 | Parrella | 165/45 |

FOREIGN PATENT DOCUMENTS

| | | | |
|---|---|---|---|
| EP | 1486741 A1 | 12/2004 | |
| JP | 2003156294 A | 5/2003 | |
| JP | 2009092350 A | 4/2009 | |
| WO | WO 2008/003184 A1 | 1/2008 | |

OTHER PUBLICATIONS http://igshpa.okstate.edu/geothermal/geothermal.html.
http://summitmechsystems.com/pages/3.1html.
http://www.renewableheating101.com/geothermal/loops.
http://www.informedbuilding.com/Geothermal/Main16/Types-of Geotherm.
International Ground Source Heat Pump Association (IGSHPA) website is at http://www.igshpa.okstate.edu/geothermal/geothermal.html; The IGSHPA was established in 1987.
Summit Mechanical (Summit) website at www.summitmechsystems.com/pages/3.1.html; 2009.
www.renewableheating101.com/geothermal/loops; 2009; see https://plus.google.com/101321559606193611805/.
http://minnesotageothermalheatpumpassociation.com/geothermal website address; 2009; Minnesota Geothermal Heat Pump Association.
http://www.informedbuilding.com/Geothermal/Main16/Types-of-Geotherm now located at http://www.informedbuilding.com/content/view/17/68/ for geothermal; 2009; Informed Building.

* cited by examiner figure 1 figure 1a figure 2 figure 3 figure 4 figure 4a figure 4b figure 5a

TWISTED CONDUIT FOR GEOTHERMAL HEATING AND COOLING SYSTEMS

BACKGROUND OF THE INVENTION

A. Field of the Invention

The present invention relates to a conduit comprising 2 or more pipes that are twisted together. Said conduit is an integral part of a geothermal heating and cooling system. Geothermal heating and cooling systems are known for their superior performance in delivering efficient heating and cooling to homes, industrial buildings and residential and industrial complexes, as well as being environmentally clean and cost effective. See, for example,
http://www.igshpa.okstate.edu/geothermal/geothermal.html;
www.summitmechsystems.com/pages/3.1.html;
www.renewableheating101.com/geothermal/loops;
http://minnesotageothermalheatpumpassociation.com/geothermal/earth-loop-options/; and http://www.informedbuilding.com/Geothermal/Main16/Types-of-Geotherm. However, a barrier to the wide spread use of geothermal heating and cooling systems is the high cost of installation of the ground loop of pipes that the system requires. Also, the presently available ground-loop pipes are not ideal in terms of heat transfer and utilization of the borehole required to install the vertical ground loop pipes.

B. Description of the Related Art

The art has attempted to overcome these barriers to market entry for this efficient heating and cooling system. The aforementioned websites discuss the currently available ground loop technology. For example, the commonly used ground loop technologies are: horizontal ground loops, vertical ground loops, and slinky coil ground loops. However, horizontal ground loops require a substantial amount of land. Currently available vertical loops, including multiple pipe vertical loops use less land, but their configuration does not optimize heat transfer, as does the present invention. Finally, the slinky coil ground loop is a variation of the horizontal ground loop and it too requires a substantial amount of land.

Also, inventors have sought patents on conduits to solve the problems with the current technology. For example, U.S. Pat. No. 5,630,447 ('447) discloses a pipe design that utilizes the entire borehole; and therefore transfers more heat to the ground. Further, the '447 invention allows for reduction in the size of the borehole required for a pipe capable of handling a specified flow of heat transfer fluid. The '447 invention, however, has some limitations. Said limitation being the pipe design and the cost of said design both in terms of time and money. The standards set by ASTM specify that pressure pipes have a round configuration. The pressure rating is derived by a combination of material strength and diameter to pipe wall thickness ration. The smaller this ration the higher the pressure rating of the pipe will be. The pipe represented in U.S. Pat. No. 5,630,447 is not round according to the standard, set by ASTM, to determine pressure tolerance of a pipe, and therefore cannot be governed by the same standard. Thus, new standards will need to be written and approved by standard setting bodies such as ASTM and IGSHPA. This process could be costly and time consuming. Additionally the U.S. '447 pipe inherently keeps the heat transferring fluid in the in and out flow pipes in close proximity to each other; thus causing heat contamination from the inflow to the outflow pipe. U.S. Pat. No. 5,630,447 does address this problem by introducing the notion of an insulating space between the inflow and outflow pipe. However, this design further complicates the pipe design certification issues.

Finally, U.S. Pat. No. 5,477,914 ('914) discloses a ground source heat exchanger unit comprising a primary conduit and a plurality of secondary conduits for receiving heat transfer fluid. Said secondary conduits are spaced apart from each other. The '914 system is not designed for optimal use of the borehole due to the spacing between the secondary conduits. FIG. 1 of the '914 disclosure illustrates the fact that the '914 system requires greater land usage than a typical narrow borehole installation. Since the borehole is a very costly part of the installation of these systems, the '914 design becomes costly to install because of the larger diameter borehole required by the '914 system.

The '914 system will be inherently more cumbersome to manage because of the flexibility of the pipe in conjunction with the spacing required between the pipes. Specifically, it will be difficult to install the '914 invention in vertical boreholes and trenches because the pipes will tend to become disarranged from their designed arrangements. This is especially true when the installation takes place in a vertical borehole filled with water. The '914 inventor suggests a solution. He uses spacers installed at intervals on the pipe. However, this increases the cost of assembly and transportation of the '914 system.

Also, the '914 invention uses an insulated pipe. Said insulated pipe does not contribute to the heat transfer process while occupying space in the borehole, and system efficiency is compromised.

Vertical borehole installations of the ground loop are usually required to be at least partially grouted. To optimize heat transfer it is common to grout the entire bore. This is accomplished by the insertion of a grout pipe all the way to the bottom of the bore. This grout pipe can sometimes be very difficult to insert into the bore as it has a tendency to catch on various irregular surfaces. The added spacers in the '914 configuration in conjunction with the space between pipes will make inserting this grout pipe cumbersome and laborious because the pipe may get caught on the spacers.

Applicant's invention overcomes the problems with the art. Specifically, Applicant twists 2 or more pipes together, making more efficient use of the bore hole space by placing more pipe into the borehole; thus creating more heat transfer surface area than the presently available pipe configurations. The twisting of the pipes also improves heat transfer by increasing turbulent flow within the pipes.

Because the 2 or more pipes are twisted together, said twisted pipes will support one another during installation. Further, said twisted pipe arrangement is easily rolled up and transported to a job site.

Further, the grout pipe is an option, not a requirement. Said optional grout pipe may eliminate the need for insulating material to prevent cross contamination between in and out flow pipes when the pipe is evacuated of grout and replaced with air.

In sum, the advantages of the Applicant's invention over the current technologies are:

1. The conduit of the present invention can be manufactured from existing components and use in the market can begin almost immediately.

2. The conduit of the present invention allows for greater thermal transfer from pipe to ground. Not wishing to be bound by theory, the twisting of the 2 or more pipes improves heat transfer by increasing turbulence and increasing residence time in the in and out flow pipes. In other words, the present invention increases thermal transfer surface area due to the twisted pipe configuration; and turbulent flow in the twisted pipes increases heat transfer from pipe to ground. If desired, the optional grout pipe may be emptied of grout and replaced by air or any insulating gas, thus promoting pipe-to-pipe insulation.

SUMMARY OF THE INVENTION

The present invention relates to a conduit for use in a geothermal heating and cooling system wherein said conduit comprises 2 or more pipes, wherein further, said 2 or more pipes comprising said conduit are twisted together.

The present invention further relates to a conduit for use in a geothermal heating and cooling system wherein said conduit comprises 2 or more pipes, wherein further, said 2 or more pipes comprising said conduit are twisted together, further provided that said 2 or more twisted pipes comprising said conduit are arranged to be contiguous, arranged to be separated by a spacing member, or arranged so that said 2 or more twisted pipes comprising said conduit have both contiguous pipes and pipes separated by a spacing member. A grout pipe is optional.

DEFINITIONS AND USAGES OF TERMS

The term "borehole", as used herein, means a narrow shaft drilled in the ground for the purpose of installing a pipe. The borehole can be in a vertical direction, in a horizontal direction, in a diagonal direction or even deviated (i.e. turning). A borehole shaft is advantageous since it is narrow and requires less space and costly excavation and installation.

The term "ASTM standards", as used herein, means the standards that must be complied with in order to produce pipe for geothermal heating and cooling systems. IGSHPA has installation guidelines that specify the piping systems that meet ASTM standards.

The term "grout pipe", as used herein, means a pipe that is inserted into the borehole to facilitate the filling of the borehole with grout. The grout pipe is optional. In an embodiment of the invention, said optional grout pipe may be installed as a straight pipe and the inflow and out flow pipes are twisted around said straight optional grout pipe. In another embodiment, said optional grout pipe may be twisted together with twisted inflow and out flow pipes. In other words, the optional grout pipe may be a twisted pipe.

The term "contiguous", as used herein, means touching, contacting, or abutting.

The term "inflow", as used herein, refers to the movement of the fluid in the pipes in a vertical direction away from the structure to be heated or cooled and into the earth.

The term "outflow", as used here, refers to the movement of the fluid in the pipes in a vertical direction toward the structure to be heated or cooled.

The number and arrangement of the inflow and outflow pipes is at the discretion of the assembler. There need not be an equal number of inflow and out flow pipes.

As used herein, a "spacing member" is optionally used to separate in flow and out flow pipes. Additionally, said spacing member may optionally serve as an insulating material (i.e an insulator). Said insulating material is a foam or non foam material that is flexible enough to follow the contours of the conduit in any embodiment of the present invention.

The term "twisted", as used herein, means that the pipes comprising the conduit of the present invention are wound or intertwined together or wound around a straight pipe.

DETAILED DESCRIPTION OF THE INVENTION

The present invention relates to a conduit for use in a geothermal heating and cooling system wherein said conduit comprises 2 or more pipes, wherein further, said 2 or more pipes comprising said conduit are twisted together.

The present invention further relates to a conduit for use in a geothermal heating and cooling system wherein said conduit comprises 2 or more pipes, wherein further, said 2 or more pipes comprising said conduit are twisted together, further provided that said 2 or more twisted pipes comprising said conduit are arranged to be contiguous, arranged to be separated by a spacing member, or arranged so that said 2 or more twisted pipes comprising said conduit have both contiguous pipes and pipes separated by a spacing member.

The present invention also relates to a conduit for use in a geothermal heating and cooling system wherein said conduit comprises 2 or more pipes, wherein further, said 2 or more pipes are twisted together, further provided that said 2 or more twisted pipes are twisted around an optional grout pipe.

The present invention further relates to a conduit for use in a geothermal heating and cooling system wherein said conduit comprises 2 or more pipes, wherein further, said 2 or more pipes are twisted together, further provided that said 2 or more twisted pipes are twisted around at least one grout pipe.

The present invention also relates to a conduit for use in a geothermal heating and cooling system wherein said conduit comprises 2 or more pipes, wherein further, said 2 or more pipes comprising said conduit are twisted together, further provided that said 2 or more twisted pipes comprising said conduit are arranged to be contiguous, arranged to be separated by a spacing member, or arranged so that said 2 or more twisted pipes comprising said conduit have both contiguous pipes and pipes separated by a spacing member, further provided that said 2 or more twisted pipes are twisted around an optional grout pipe.

Additionally, the present invention relates to a conduit for use in a geothermal heating and cooling system wherein said conduit comprises 2 or more pipes, wherein further, said 2 or more pipes comprising said conduit are twisted together, further provided that said 2 or more twisted pipes comprising said conduit are arranged to be contiguous, arranged to be separated by a spacing member, or arranged so that said 2 or more twisted pipes comprising said conduit have both contiguous pipes and pipes separated by a spacing member, further provided that said 2 or more twisted pipes are twisted around at least one grout pipe.

The Conduit of the Present Invention Comprises 2 or More Twisted Pipes

Any number of twisted pipes may comprise the conduit of the present invention. In other words, the number of twisted pipes used to create the conduit of the present invention is at the discretion of the designer.

In an embodiment of the invention, 2-20 twisted pipes comprise the conduit. In another embodiment of the invention, 4-15 twisted pipes comprise the conduit. In yet another embodiment of the invention, 7-10 twisted pipes comprise the conduit. In a further embodiment, 7 twisted pipes comprise the conduit, wherein 6 of said pipes are twisted around an optional grout pipe.

The Arrangement of the 2 or More Twisted Pipes

Any number of twisted pipe arrangements are possible. In a non-limiting embodiment, 2 pipes are twisted together. In another non-limiting embodiment, 4 pipes are twisted together. In a further non-limiting embodiment, 2 pipes are twisted around an optional grout pipe. In yet another non-limiting embodiment 6 pipes are twisted together. In still another non-limiting embodiment, 8 pipes are twisted around an optional grout pipe. In a further non-limiting embodiment, 16 pipes are twisted around an optional grout pipe. Additionally, 20 pipes may be twisted together.

Further, the 2 or more twisted pipes of the conduit of the present invention can be arranged in contiguous fashion, arranged to be separated by a spacing member, or arranged so that said conduit comprised of said twisted pipes has both contiguous and separated twisted pipes. By way of a non limiting example, 2 twisted pipes may be contiguous or said 2 twisted pipes may have a spacing member between them.

One skilled in the art understands that the number and arrangement of twisted inflow and outflow pipes is at the discretion of the assembler and based on the needs of the user of the geothermal system. By way of non-limiting example, in a 7 twisted pipe arrangement, 4 twisted pipes can be inflow and 3 twisted pipes can be outflow, or 3 twisted pipes can be inflow and 4 twisted pipes can be outflow. Further non-limiting examples of inflow and out flow pipe arrangements include, 3 twisted in flow pipes and 3 twisted outflow pipes and one optional grout pipe; 1 twisted inflow pipe and 5 twisted outflow pipes twisted around an optional grout pipe. Said twisted inflow or outflow pipes may be arranged in contiguous fashion, arranged to be separated by a spacing member, or arranged so that said conduit comprised of said 2 or more twisted pipes has both contiguous and separated pipes. In the case of a 2 pipe twist, one pipe will be inflow and the other pipe will be outflow.

In a further embodiment of the invention, twisted inflow and outflow pipes may be grouped together. For example, an embodiment of the invention may be a group of 3 twisted inflow pipes and a group of 3 twisted outflow pipes. In another embodiment, twisted inflow pipes may alternate with twisted outflow pipes. In other words, the arrangement of pipes may be twisted inflow pipe—twisted outflow pipe—twisted inflow pipe—twisted outflow pipe. Said alternating inflow and out flow pipes may be separated or contiguous as described hereinabove.

Typically, the pipes useful in the present invention are plastic. Plastic materials suitable for piping include polyvinyl chloride (PVC), chlorinated polyvinyl chloride (CPVC), fibre reinforced plastic (FRP), reinforced polymer mortar (RPMP), polypropylene (PP), polyethylene (PE), cross-linked high-density polyethylene (PEX), polybutylene (PB), and acrylonitrile butadiene styrene (ABS), PEX/Aluminium/PEX, for example. In an embodiment of the invention, PE and PEX are preferred.

The Optional Grout Pipe

One or more grout pipes are optional. In an embodiment, one grout pipe is installed. The location of said grout pipe is at the discretion of the installer. The grout pipe is, preferably centrally located as it should not occupy heat transferring area. Said grout pipe may be twisted or straight as shown in FIGS. 4b and 4a, respectively.

The Optional Spacing Member

The optional spacing member is used to separate the twisted in flow and twisted out flow pipes. Additionally, said spacing member may optionally serve as an insulating material (i.e an insulator). Said insulating material is a foam or non foam material that is flexible enough to follow the contours of the conduit In an embodiment of the present invention, said optional spacing member may be a single unit piece. In a further embodiment of the invention, individual spacing members may be inserted between the pipes.

The use and location of the spacing members is at the discretion of the designer.

Non limiting Embodiments of the Invention are illustrated in FIGS. 1-5a.

Figure 1:
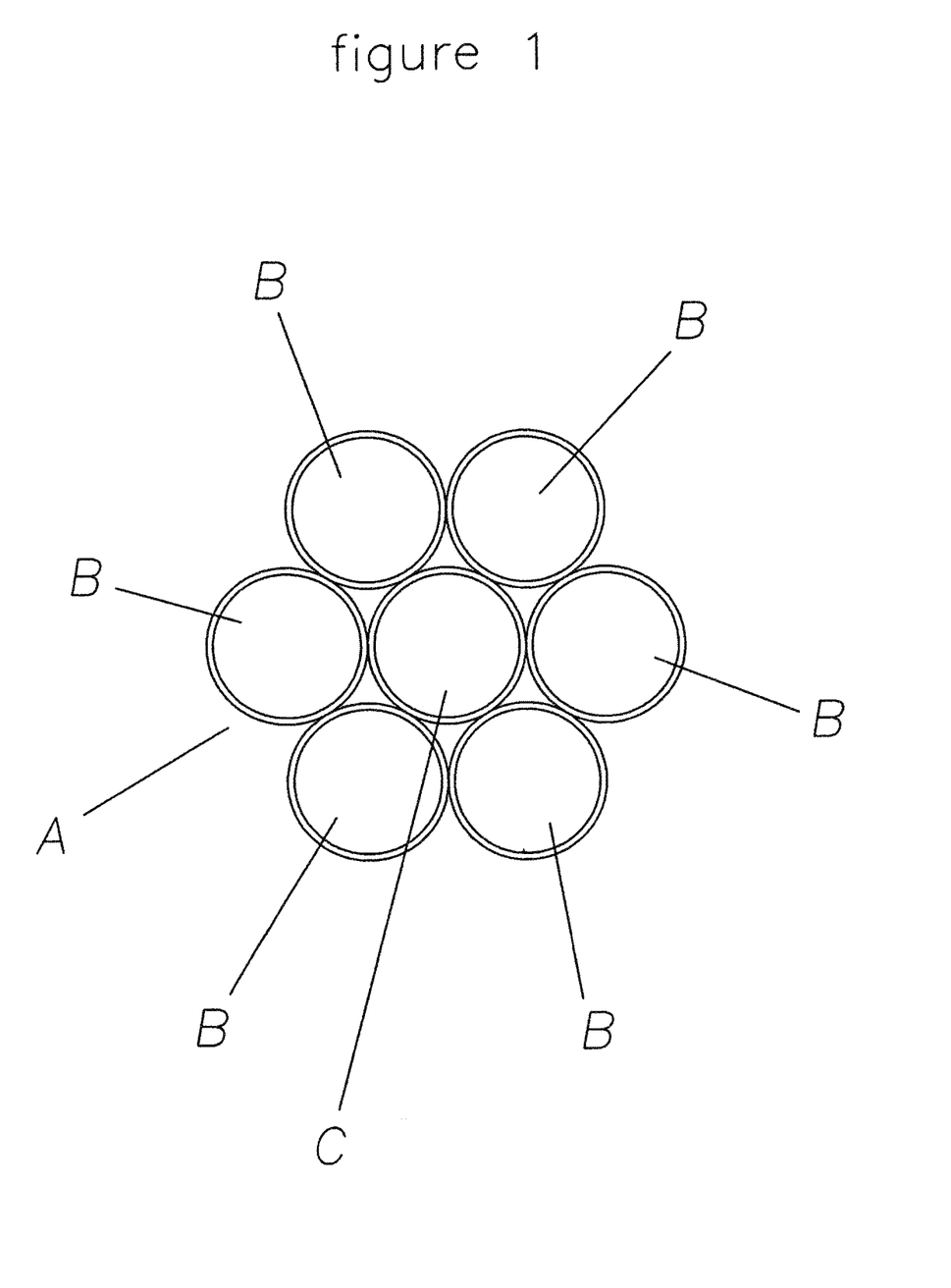
FIG. 1 is a cross sectional view of an embodiment of the conduit of the present invention.

A conduit of the present invention comprised of twisted pipes arranged in a contiguous fashion is embodied in cross sectional FIG. 1. As illustrated in cross sectional FIG. 1, said twisted pipes (B) comprising said conduit (A) are arranged in a contiguous fashion. In other words, all the twisted pipes (B) are touching.

Figure 1A:
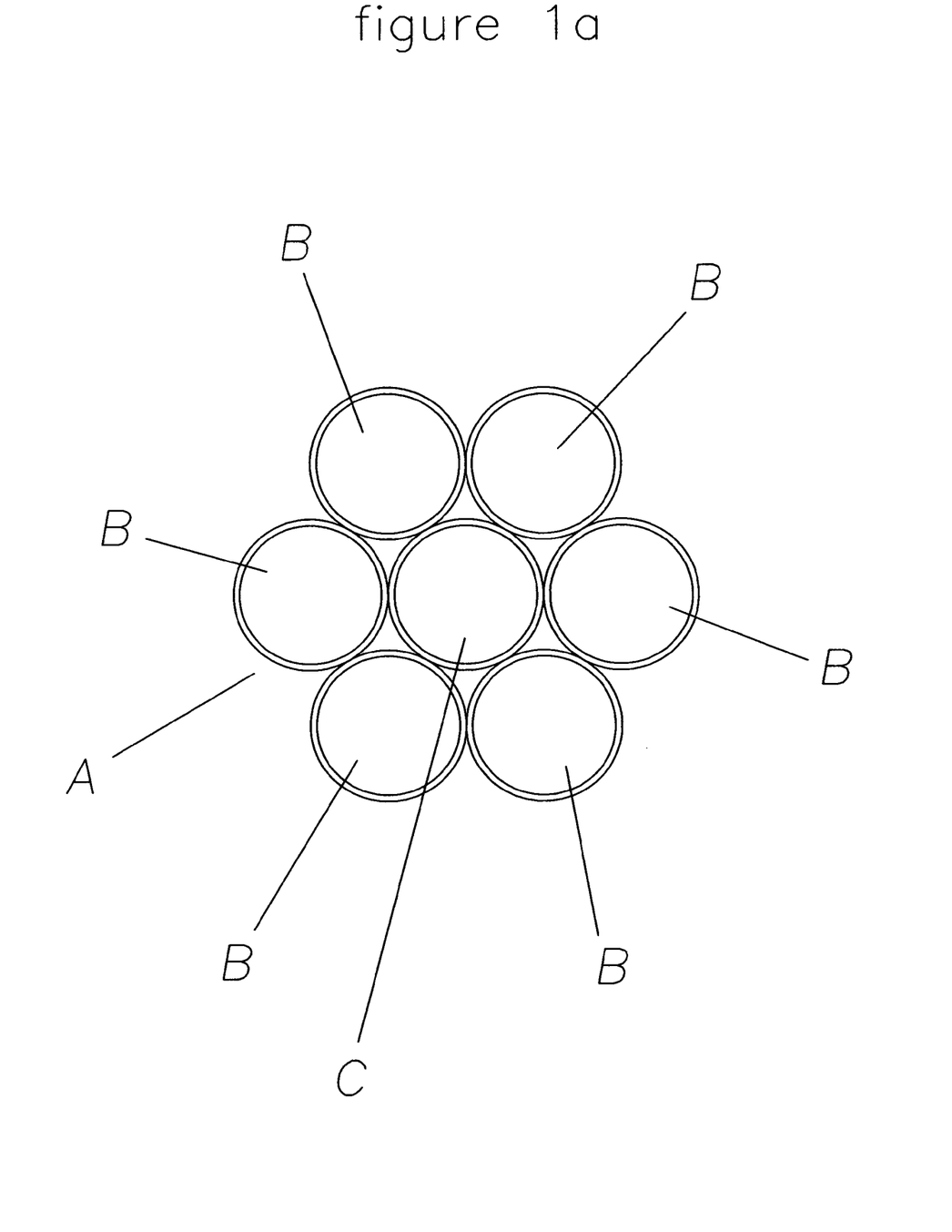
FIG. 1a is a cross sectional view of an embodiment of the conduit of the present invention.

A conduit of the present invention comprised of twisted pipes arranged in a contiguous fashion and comprising a central grout pipe is embodied in cross sectional FIG. 1a. As illustrated in FIG. 1a, said twisted pipes (B) comprising said conduit (A) are arranged in a contiguous fashion. In other words, all the twisted pipes (B) are touching and the grout pipe (C) is centrally located.

Figure 2:
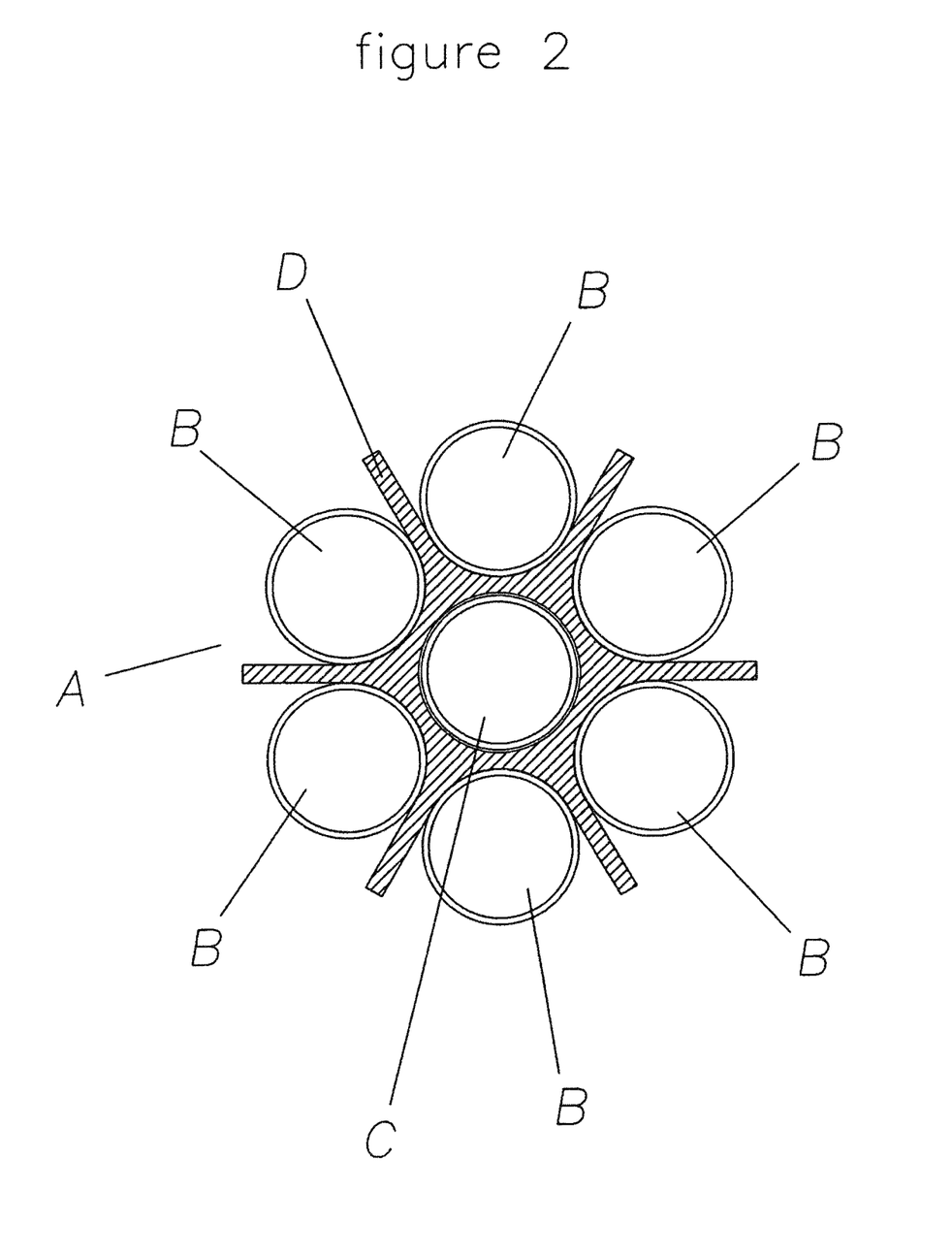
FIG. 2 is a cross sectional view of an embodiment of the conduit of the present invention.

A conduit of the present invention comprised of twisted pipes arranged to be separated by a spacing member is embodied in cross sectional FIG. 2. As illustrated in FIG. 2, said twisted pipes (B) comprising said conduit (A) are arranged to be separated by a spacing member (D). In the FIG. 2 embodiment, said spacing member (D) is a single unit piece separating all the twisted pipes (B) in the conduit (A).

Figure 3:
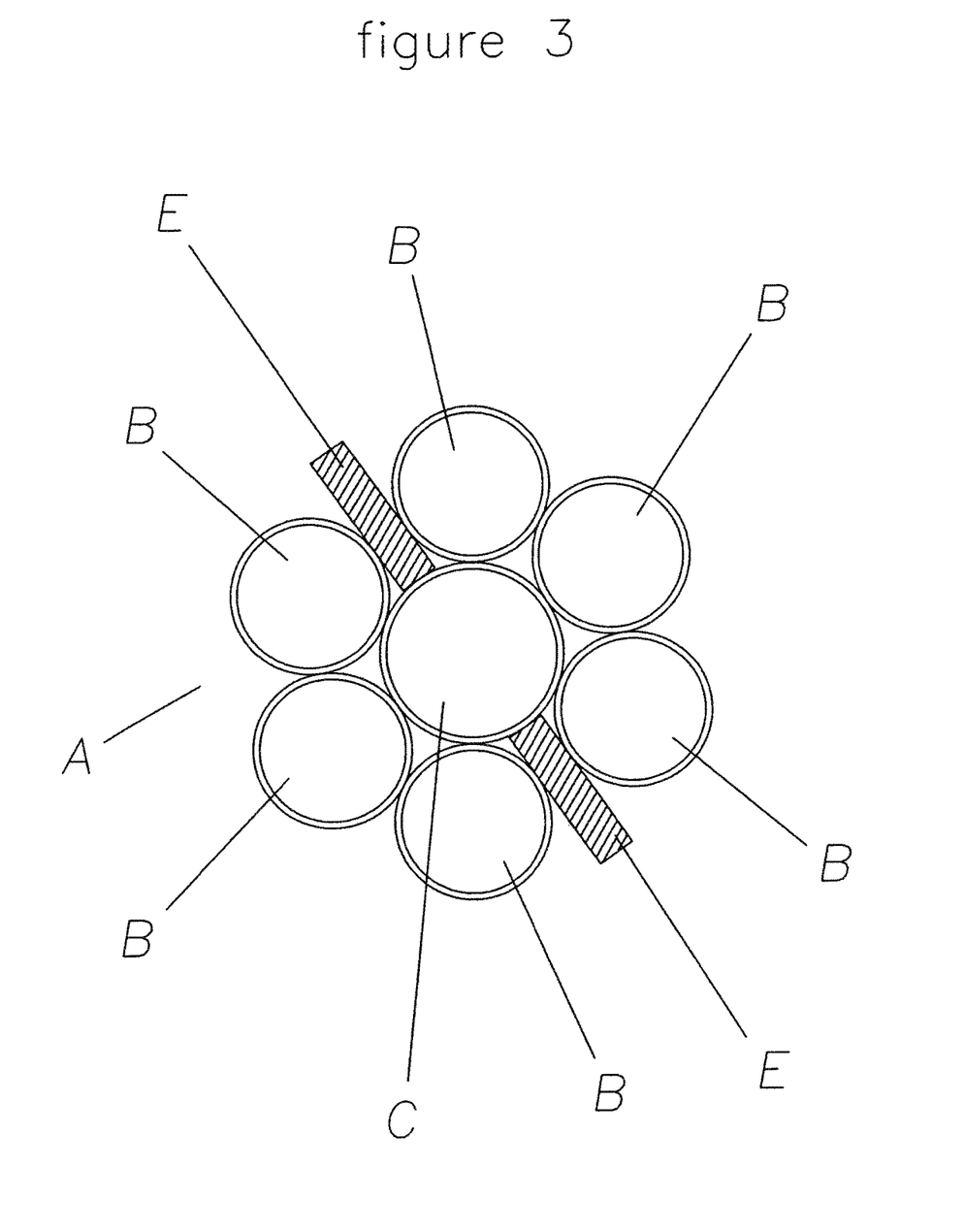
FIG. 3 is a cross sectional view of an embodiment of the conduit of the present invention.

A conduit of the present invention comprised of twisted pipes arranged in a contiguous and separated arrangement is embodied in cross sectional FIG. 3. As illustrated in FIG. 3, said twisted pipes (B) comprising said conduit (A) are arranged so that said twisted pipes (B) have both contiguous twisted pipes (B) and twisted pipes (B) separated by a spacing member (D).

Further, when using the FIG. 3 contiguous and separated pipe arrangement, the contiguous and separated pipes can be in any number of patterns. Non limiting examples include, 3 twisted pipes touching (i.e. contiguous) and 2 twisted pipes separated by spacing members, 3 twisted pipes each separated by spacing members and 3 twisted pipes touching. In yet another embodiment, 3 twisted pipes are touching (i.e. contiguous), a spacer is present, then 3 more twisted pipes that are touching (i.e. contiguous) are present, and said twisted pipes are connected to the former three twisted pipes by a spacer.

Figure 4:
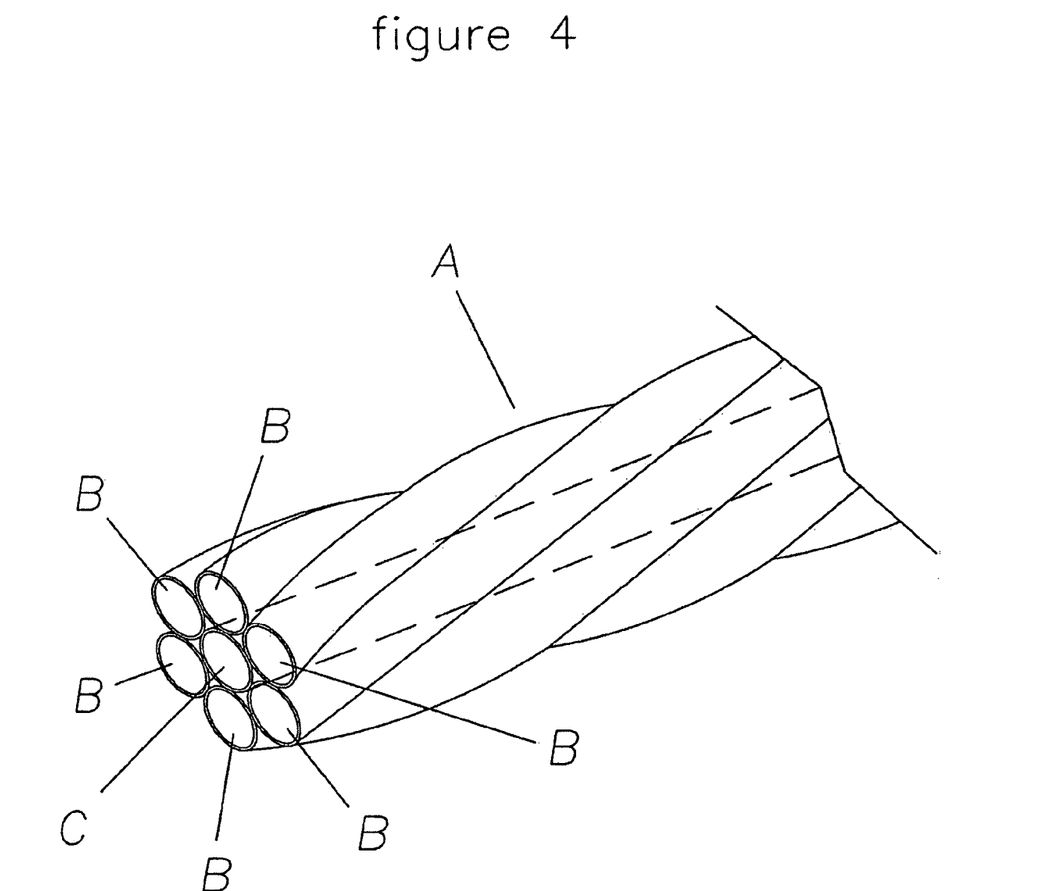
FIG. 4 is a side view of an embodiment of the conduit of the present invention.
Figure 4A:
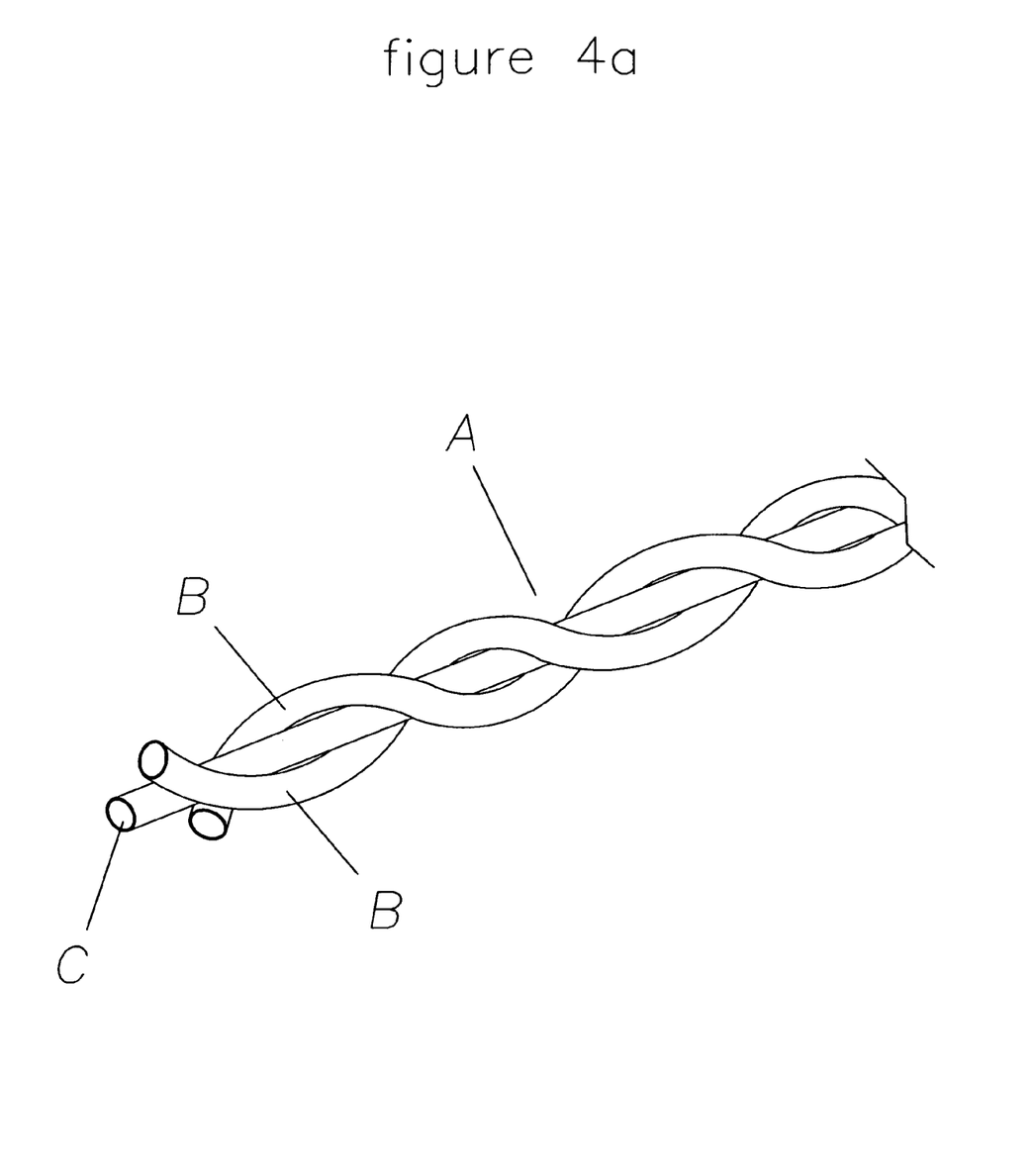
FIG. 4a is a side view of an embodiment of the conduit of the present invention.
Figure 4B:
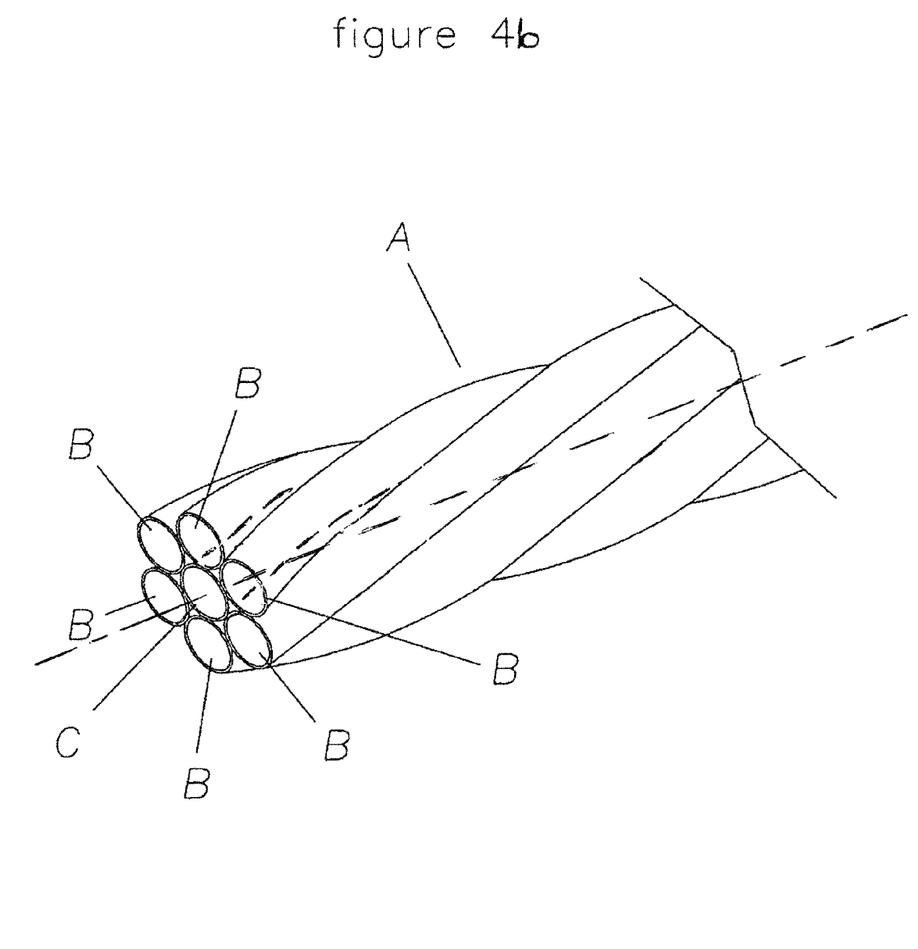

FIG. 4 is a side view schematic of the conduit (A) of the present invention comprising 2 or more twisted pipes (B). Said twisted pipes (B) are contiguous. Referring to FIG. 4, said pipes (B) comprising said conduit (A) are twisted together around a central pipe (C).

FIGS. 4a and 4b are schematics of the conduit (A) of the present invention comprising 2 twisted pipes (B). Said twisted pipes (B) are contiguous. Said twisted pipes (B) are twisted around an optional centrally located straight grout or central pipe (C) in FIG. 4a and a twisted centrally located grout pipe (C) in FIG. 4(b). As shown in FIG. 4b, twisted pipes (B) and grout pipe (C) are a helical twisted pipe arrangement with the grout pipe (C) centrally located. The conduit has a central location and a central axis as shown in FIG. 4b. The Figures show the twisted pipes (B) in a helical twisted pipe arrangement with an acute angle of twist relative to the central axis of the conduit. FIG. 4b shows the grout pipe (C) in the helical twisted pipe arrangement with an acute angle relative to the central axis of the conduit.

FIG. 4b is a side view schematic of an embodiment of the conduit of the present invention with a twisted central pipe.

Figure 5:
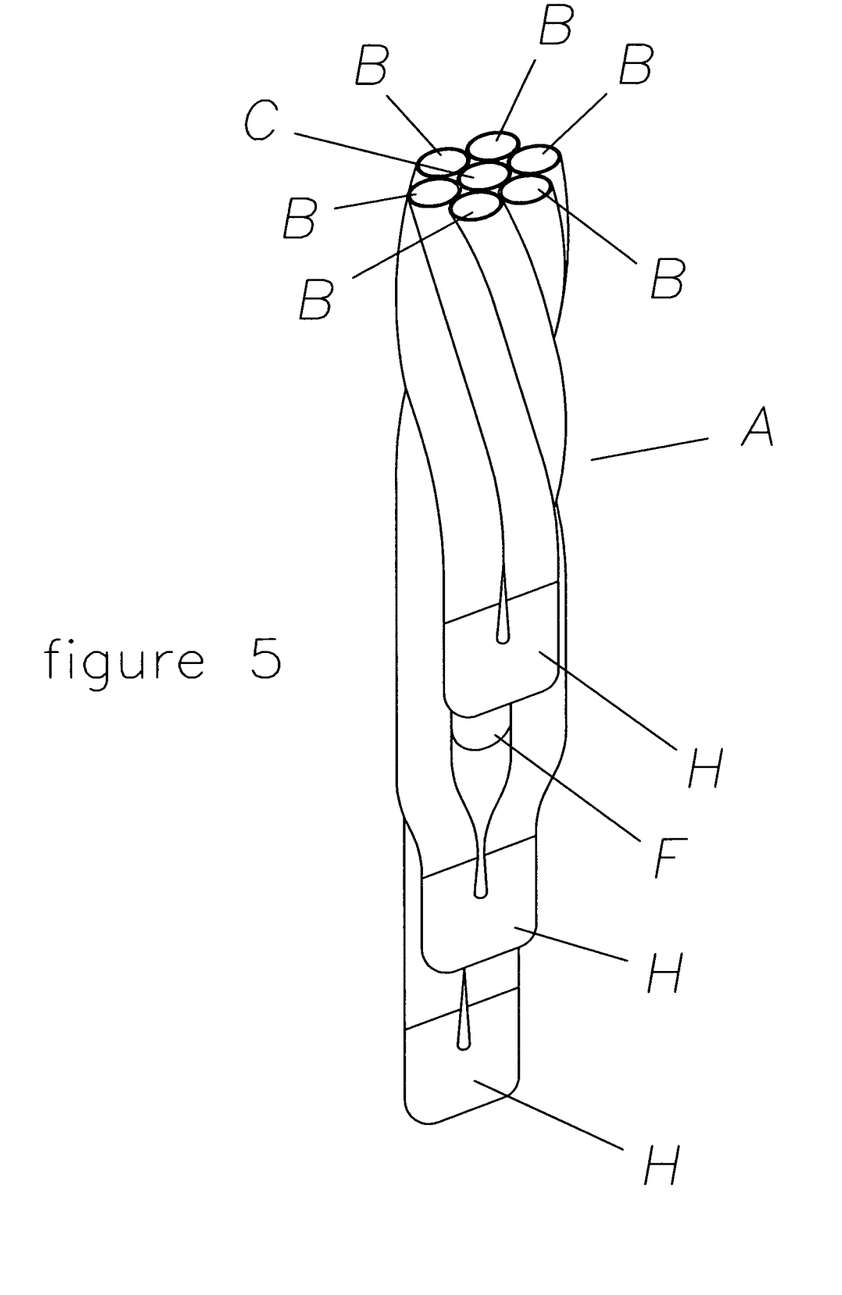
FIG. 5 is a schematic of an embodiment of the conduit of the present invention

FIG. 5 is a schematic of the conduit (A) of the present invention. For example, in FIG. 5, said twisted pipes (B) are arranged around a central grout pipe (C). Said twisted pipes (B) are contiguous. Said twisted pipes (B) are connected to U bend fittings (H). Said U bend fittings (H) allow the fluid in the twisted pipes (B) to flow in and out of the conduit (A) of the present invention. A central grout pipe (C) terminates at open-ended point (F).

Figure 5A:
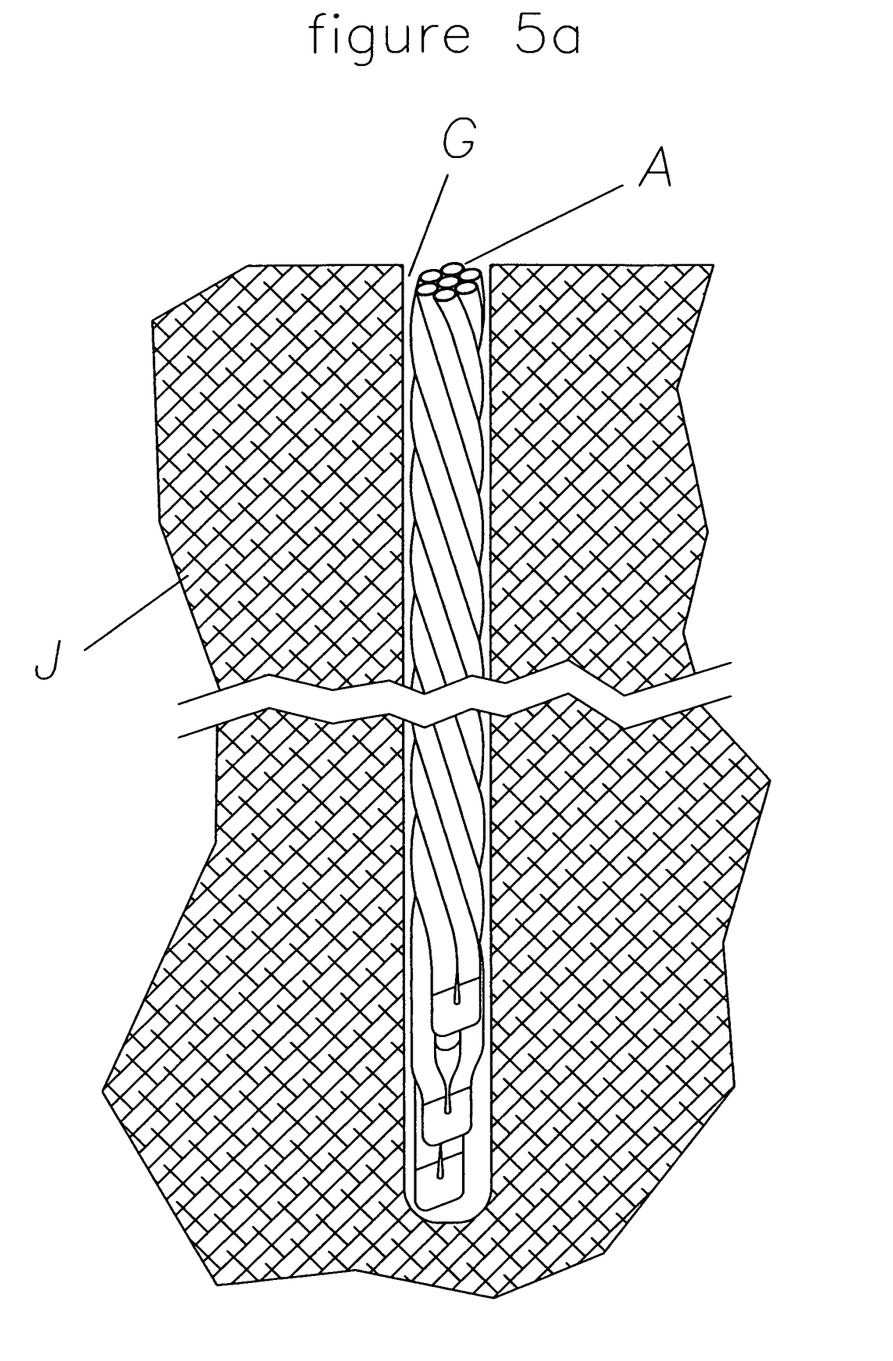
FIG. 5a is a schematic of an embodiment of the conduit of the present invention as installed in a borehole.

FIG. 5a is an embodiment of the conduit (A) of the present invention as it may be installed in a borehole (G). (J) represents the underground area where the bore hole is drilled.

One skilled in the art understands that the pipe wall thickness will depend on the depth to which the pipe will go. For example, one ordinarily skilled knows that the greater the depth the greater the pressure the pipe will need to withstand.

One skilled in the art also knows that the size and length of the pipe can be varied according to the requirements of the system and the climate where the installation takes place, along with ground conditions of where the installation is taking place. Further, the fluid flowing through the pipes can be water or water with antifreeze solution, or any acceptable cooling medium used by the geothermal heating and cooling industry.

The Conduit of the Present Invention is Formed by Twisting 2 or More Pipes Together.

Twisting allows for more pipe to be inserted into the borehole, thus facilitating turbulent flow and increased heat transfer. Any number of twisting configurations and twisting directions may be employed in the practice of the present invention. In other words, the 2 or more pipes of the present invention can be twisted in a relatively tighter or looser fashion. The twisting can be clockwise or counter clockwise. Clockwise and counter wise twisting may occur along the same length of pipe. Also, both tighter and looser twists may occur along the same length of pipe. The choice of twisting configurations and twisting directions is at the discretion of the designer.

Installation of the Present Invention

In an embodiment of the invention, the pre-fabricated twisted pipes conduit of the present invention will be transported to the construction site for insertion into the borehole. Optionally, the pipes can be twisted on site. There are several methods of installation (vertical, horizontal, diagonal, deviated). In a further embodiment of the present invention the twisted pipe conduit is installed vertically by means known to those skilled in the art.

I claim:

1. A conduit adapted for use as a subterranean geothermal heat exchanger, the conduit comprises:
   a. a twisted pipe arrangement that includes a central pipe, said central pipe is open-ended, said central pipe does not convey heat exchange fluid the central pipe centrally located in the twisted pipe arrangement;
   b. two or more outer pipes included in the twisted pipe arrangement, the two or more outer pipes in a twisted pipe configuration around said central pipe, said two or more outer pipes adapted to convey heat exchange fluid, said two or more outer pipes include at least one in-flow pipe and at least one out-flow pipe, said twisted pipe arrangement includes the two or more outer pipes separated and said two or more pipes touch the central pipe, said two or more outer pipes twisted around said central pipe configured for transportation and insertion, said twisted pipe configuration of the two or more outer twisted pipes configured-to exchange heat with the external environment; and
   c. a fitting, said two or more outer pipes direct the flow of said heat exchange fluid from said at least one in-flow pipe to said at least one out-flow pipe, the fitting connects the at least one in-flow pipe and the at least one out-flow pipe, the twisted pipe arrangement inserted in the ground, the two or more outer pipes in the twisted pipe configuration of twisted pipes inserted in the ground and transfers heat with the ground in the twisted pipe arrangement, wherein the twisted pipe arrangement includes a helical twist, the two or more outer pipes separated from another, the central pipe has a twisting configuration that includes a helical twist at an acute angle relative to a central axis of the twisted pipe arrangement located in the ground.

2. The conduit of claim 1, wherein said two or more outer pipes are arranged to be separated by a spacing member.

3. The conduit of claim 2, wherein said spacing member is an insulator.

4. The conduit of claim 1, wherein said pipes are constructed from plastic materials including polyvinyl chloride (PVC), chlorinated polyvinyl chloride (CPVC), fibre reinforced plastic (FRP), reinforced polymer mortar (RPMP), polypropylene (PP), polyethylene (PE), high density polyethylene (HDPE), cross-linked high-density polyethylene (PEX), polybutylene (PB), and acrylonitrile butadience styrene (ABS), and PEX/Aluminum/PEX.

5. The conduit of claim 1, wherein the fitting is a U bend that connects each at least one in-flow pipe and at least one out-flow pipe.

6. The conduit of claim 1, wherein the two or more outer pipes twisted around the central pipe is positionable in a roll for transportation and the two or more outer pipes twisted around the central pipe are configured for installation into a borehole, the central pipe a grout pipe.

7. The conduit of claim 1, wherein the central pipe is an open ended central pipe and the two or more outer pipes twisted around said central pipe are pre-fabricated as the twisted pipe arrangement, the twisted pipe arrangement is configured for transportation and installed as the twisted pipe arrangement for geothermal heat exchange.

8. The conduit of claim 1, wherein the at least one in-flow pipe includes multiple in-flow pipes and the at least one out-flow pipe includes multiple out-flow pipes and the in-flow pipes are grouped together and the out-flow pipes are grouped together.

9. A conduit for use as a geothermal heat exchanger, the conduit comprises:
   a twisted pipe arrangement that includes a central pipe, the central pipe is open ended; and
   two or more pipes included in the twisted pipe arrangement, the two or more pipes twisted, at least one of the two or more pipes arranged to touch the central pipe and said two or more pipes arranged to be separated, said two or more pipes include at least one in-flow pipe and at least one out-flow pipe, the two or more pipes twisted around the central pipe, the central pipe is centrally located in the twisted pipe arrangement and the two or more pipes twisted around the central pipe as a pre-fabricated twisted conduit and the pre-fabricated twisted conduit has a pre-fabricated twisted pipe configuration of the two or more pipes around the central pipe, the two or more pipes are outer pipes, the two or more outer pipes twisted around the central pipe, the conduit as the pre-fabricated twisted pipe arrangement arranged for transportation in a roll, the twisted pipe arrangement includes the two or more outer pipes and the central pipe, the twisted pipe arrangement inserted in the ground in the twisted pipe configuration of the two or more outer pipes around the central pipe, the pre-fabricated twisted pipe arrangement transfers heat between the outer pipes and the ground using the same twisted pipe configuration of the two or more pipes of the pre-fabricated twisted pipe arrangement, wherein the twisted pipe arrangement includes a helical twist, the two or more outer pipes separated from one another, the central pipe has a twisting configuration that includes a helical twist at an acute angle relative to a central axis of the twisted pipe arrangement located in the ground.

10. The conduit of claim 9 that further includes a spacing member and the spacing member separates the at least one in flow and the at least one out flow pipes.

11. The conduit of claim 9 that further includes a spacing member and the spacing member separates each pipe of the two or more outer pipes.

12. The conduit of claim 9, wherein the two or more outer pipes further include at least one fitting that connects the at least one inflow pipe and the at least one out flow pipe.

13. The conduit of claim 9, wherein the twisted pipe arrangement of the two or more pipes and central pipe is pre-fabricated and rolled up for transportation and the twisted pipe arrangement is unrolled and installed in the ground and the two or more pipes of the twisted pipe arrangement installed in ground arranged for geothermal heat exchange as the pre-fabricated twisted assembly.

14. The conduit of claim 9, wherein the central pipe is a centrally positioned grout pipe and the two or more pipes are outer pipes twisted around the central pipe.

15. The conduit of claim 9, wherein the central pipe is a heat transfer insulator.

16. The conduit of claim 9, wherein the at least one in-flow pipe includes multiple in-flow pipes and the at least one out-flow pipe includes multiple out-flow pipes and the in-flow pipes are grouped together and the out-flow pipes are grouped together.

17. A conduit adapted for use as a geothermal heat exchanger, the conduit comprises:
    a twisted pipe arrangement that includes two or more pipes, the two or more pipes arranged to be separated, the two or more pipes include at least one in flow pipe and at least one out flow pipe; and
    a central pipe included in the twisted pipe arrangement, the central pipe is open ended and centrally located in the twisted pipe arrangement the two or more pipes twisted around the central pipe, the twisted pipe arrangement includes the two or more pipes twisted around the central pipe, the two or more pipes arranged to be separated and to touch the central pipe, the twisted pipe arrangement of the central pipe and two or more pipes configured for rolling up for transportation and said twisted pipe arrangement configured for installation and operational use in the twisted pipe arrangement,
    the twisted pipe arrangement inserted in the ground, the inserted two or more outer pipes of the twisted pipe arrangement exchange heat with the ground in the twisted pipe configuration, wherein the twisted pipe arrangement includes a helical twist, the two or more pipes separated from one another, the central pipe has a twisting configuration that includes a helical twist at an acute angle relative to a central axis of the twisted pipe arrangement located in the ground.

18. The conduit of claim 17, wherein the conduit further includes a spacing member.

19. The conduit of claim 18, wherein the spacing member is an insulator.

20. The conduit of claim 17, wherein the at least one in-flow pipe includes multiple in-flow pipes and the at least one out-flow pipe includes multiple out-flow pipes and the in-flow pipes are grouped together and the out-flow pipes are grouped together.

* * * * *